United States Patent [19]

Howell

[11] 4,096,414
[45] Jun. 20, 1978

[54] DIMMER CONTROL CIRCUIT

[75] Inventor: Sabert N. Howell, Huntington, N.Y.

[73] Assignee: CBS Inc., New York, N.Y.

[21] Appl. No.: 800,142

[22] Filed: May 24, 1977

[51] Int. Cl.² .................. G05F 1/00; H05B 37/02; H05B 39/04; H05B 41/36
[52] U.S. Cl. ................................ 315/291; 315/195; 315/299; 315/316
[58] Field of Search ............... 315/195, 254, 287, 291, 315/292, 293, 294, 295, 299, 313, 316, 317

[56] References Cited

U.S. PATENT DOCUMENTS

| | | | |
|---|---|---|---|
| 3,397,344 | 8/1968 | Skirpan | 315/195 |
| 3,816,797 | 6/1974 | Skirpan | 315/291 |
| 4,057,751 | 11/1977 | Bonsignore et al. | 315/292 X |

*Primary Examiner*—Alfred E. Smith
*Assistant Examiner*—Robert E. Wise
*Attorney, Agent, or Firm*—Spencer E. Olson

[57] ABSTRACT

An improved solid state electronic dimmer circuit for controlling the intensity of large electric lamps, such as theater and television lamps, in response to a low power DC control signal. The transfer characteristic of the circuit is determined by the properties of a generated precision waveform having a predetermined shape and amplitude and a fixed phase relationship to the power line voltage which, in conjunction with the DC control signal, determines the effective voltage at the output of a dimmer unit. The same precision waveform may be used to control a plurality of dimmer channels, thereby making possible precise matching of performance of all commonly controlled channels, and effecting significant savings in the cost of manufacture.

9 Claims, 3 Drawing Figures

DIMMER CONTROL CIRCUIT

BACKGROUND OF THE INVENTION

This invention relates to lighting control systems, and more particularly to electronic control apparatus for controlling the intensity of electric lamps for illumination control on television and theatrical stages, or in similar applications where accuracy as well as specialized control are required to effect predetermined lighting cues.

Lighting control apparatus is known, from U.S. Pats. Nos. 3,397,344 and 3,816,797 for example, wherein the transfer characteristic of the dimmer control circuit provides a fixed relationship between a low power direct current control signal and the light output, the transfer characteristics of the circuit described in the latter patent being adjustable so that the relationship between control signal and light output can be readily altered to satisfy the somewhat different requirements of theater and television applications. In the circuit of U.S. Pat. No. 3,816,797, the transfer characteristic is determined primarily by a pair of transistors, the degree of conductivity of which controls the time required for a capacitor to charge to a value which will trigger a unijunction transsiter, thereby to determine the delay period in each half cycle of the line voltage at which time the unijunction transistor will trigger. These active elements, that is, the two transistors and the unijunction transistor, as well as their associated circuit components, being subject to some variation from component to component, the extent to which the parameters of the components of one dimmer channel match the parameters of corresponding components of other channels determines how well the performance from one channel to another is matched. In other words, unless the active components in two channels are carefully matched, even if the same direct current control signal is applied to both, the effect on the lamps being controlled may not be the same, an obviously undesirable result.

Another disadvantage of the U.S. Pat. No. 3,816,797 control circuit is that it requires for its operation two sixty cycle transformers and one pulse transformer; since one of the control circuits is required for each dimmer channel, of which there may be a hundred or more in a given installation, the control system for a large installation obviously would be bulky and relatively costly.

It is a general object of the present invention to provide an improved dimmer control circuit for controlling the intensity of large electric lamps that is more compact, dissipates less heat, and is less costly to manufacture than dimmer control circuits heretofore available.

Another object of the invention is to provide a dimmer control system for controlling a plurality of lamps on a dimmer per lamp basis wherein the performance of the several channels is matched and is not significantly affected by the parameters of the circuit components.

SUMMARY OF THE INVENTION

Briefly, the objects of the invention are achieved by a control circuit which utilizes as a control parameter a precision waveform of predetermined amplitude and wave shape and having a precise phase relationship with the line voltage. In a studio lighting system energized by a three-phase, 60 Hz power source, a separate precision waveform is generated for each phase, each such waveform being used to control a plurality of dimmer channels the lamps of which are energized from the corresponding phase of the power source. Each of the dimmer channels associated with a given precision waveform generator includes a circuit operative to produce rectangular pulses the time of occurrence of the leading edge of which is determined by the combined potential of the shaped waveform and the level of a controllable DC voltage, and the trailing edge of which is in time coincidence with the zero crossings of the power line voltage. These rectangular pulses are applied to a pulse-forming circuit which generates drive pulses that are in time coincidence with the leading edge of successive rectangular pulses. The drive pulses are applied to a special dimmer unit, essentially comprising a pulse transformer connected to a pair of SCR's connected in inverse parallel arrangement in series with a lamp to be controlled, for controlling the firing of the SCR's in the dimmer unit to thereby control the effective voltage applied to the lamp.

BRIEF DESCRIPTION OF THE DRAWINGS

Other objects, features and advantages of the invention will become apparent, and its construction and operation better understood, from the following detailed description taken in conjunction with the accompanying drawings in which.

DESCRIPTION OF THE PREFERRED EMBODIMENTS

Figure 1:
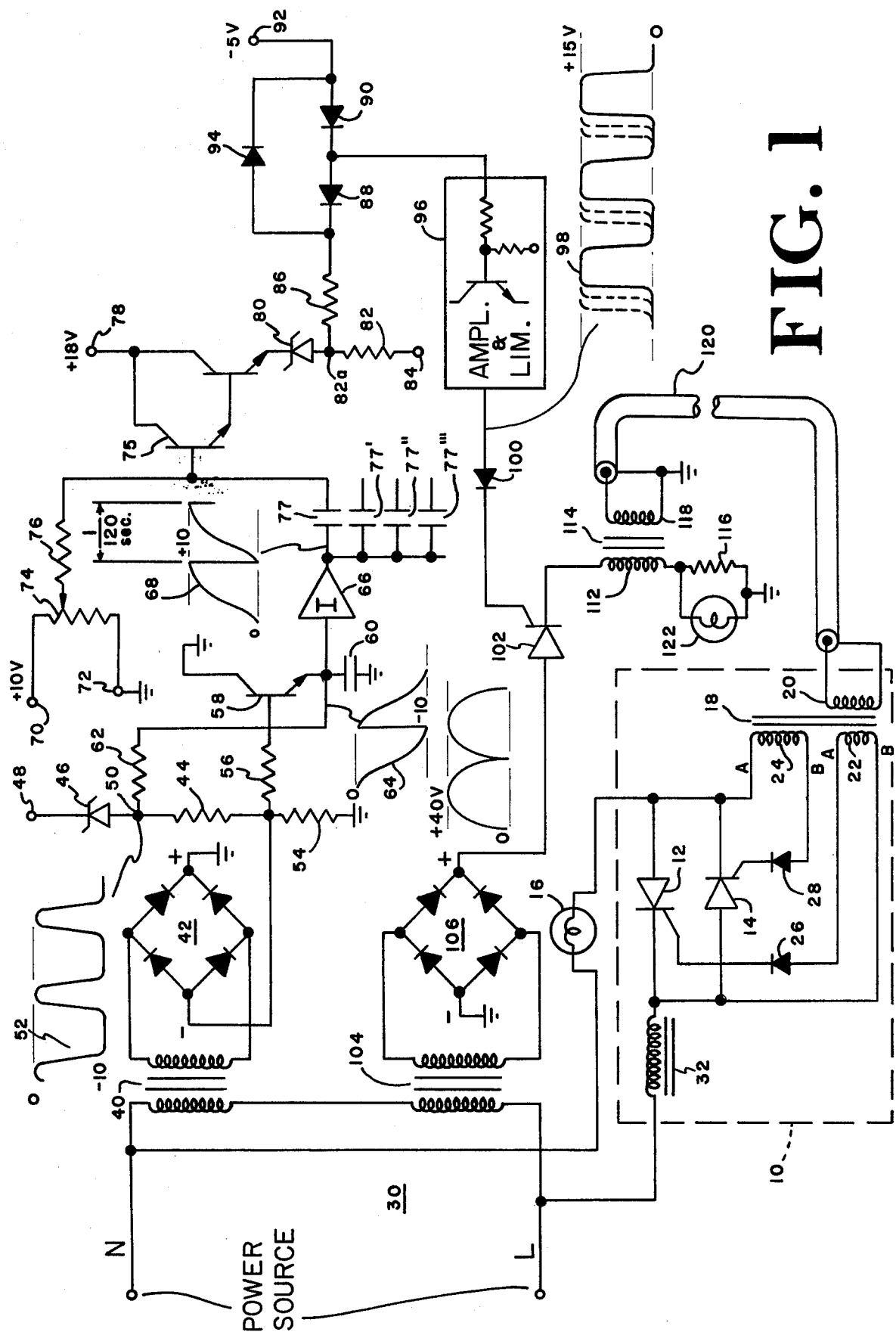
FIG. 1 is a schematic diagram illustrating one embodiment of a dimmer control circuit according to the invention.

Referring now to FIG. 1, the function of the control circuit is to provide drive pulses to a dimmer unit 10, the occurrence of which are synchronized with the occurrence of the application of half-cycles of AC line voltage to a pair of silicon controlled rectifiers (SCR) contained in the dimmer unit. The dimmer unit 10, which has design parameters appropriate to the wattage of a lamp 16 it is intended to control, includes a pulse transformer 18 having a primary winding 20 and two secondary windings 22 and 24 for coupling control pulses from the control circuit to the SCR's 12 and 14. The SCR 12 is connected with its anode-to-cathode path between the end A of secondary winding 24 and the end B of secondary winding 22, and SCR 14 is connected in inverse parallel arrangement with SCR 12, that is, with its cathode-to-anode path between the aforesaid ends of the transformer secondary windings. The end A of secondary winding 22 is connected through a diode 26 to the gate electrode of SCR 12 and the end B of secondary winding 24 is connected through a diode 28 to the gate electrode of silicon controlled rectifier 14, the diodes 26 and 28 ensuring application of only positive-going pulses to the gate electrodes. The anode of SCR 14 and the cathode of SCR 12 are connected to the line side L of a power source 30 through an inductor 32, and the cathode of SCR 14 and the anode of SCR 12 are connected to one terminal of the lamp 16, the other terminal of which is connected to the neutral side N of the power source 30. The purpose of the inductor 32 is to slow the build-up of current in the lamp upon rapid switching of the SCR's so as to reduce radiation of high frequency pulse interference into the television system with which the lighting control apparatus is associated.

In accordance with the invention, the timing of the drive pulses for the dimmer unit 10 is determined by the potential level of a controllable DC control signal (to be described) and by the shape and amplitude of a generated precision waveform which has a fixed phase relationship to the line voltage of the source 30 used to energize the lamp 16 being controlled, and is generated as follows. The voltage from the AC source 30, usually one phase of a conventional 120 volt, three-phase 60-cycle source, is stepped down to approximately 25 volts r.m.s. by a transformer 40 and applied to the AC input terminals of a full-wave bridge rectifier 42, preferably comprising silicon diodes connected as shown. The positive terminal of the bridge rectifier is connected to ground, and the unidirectional output voltage at its negative terminal, which cyclically varies from 0 to −35 volts, is connected through a resistor 44 and a breakdown diode 46, of a suitable Zener type, to a source of positive reference potential represented by the terminal 48. In a typical implementation, resistor 44 has a resistance of 2K ohms, Zener diode 46 has a breakdown potential of 15 volts and source 48 has a potential of +5 volts, thereby to produce at the junction 50 of resistor 44 and diode 46 a regulated square wave signal having an excursion from zero volts to −10 volts as shown at 52. That is, the Zener diode 46 clips the full-wave rectified signal produced at the negative terminal of rectifier 42 at the −10 volt level, thereby generating a generally square wave signal limited to −10 volts; having been generated by clipping −35 volt half-cycles of a sine wave, the spikes separating the generally square pulses are relatively narrow.

The negative terminal of bridge rectifier 42 is also connected to ground potential through a resistor 54, typically having a value of 600 ohms, and through a resistor 56, typically having a value of 20k ohms, to the base electrode of a transistor 58, which may be an NPN transistor, such as a 2N3904. The collector electrode of transistor 58 is connected to ground potential and the emitter electrode is connected to one terminal of a capacitor 60, the other terminal of which is connected to ground; typically, capacitor 60 has a value of 0.47 mfd. Junction 50 is connected through a resistor 62, typcially having a value of 27K ohms, to the ungrounded terminal of capacitor 60. The negative-going excursion of the signal at junction 50 charges capacitor 60 with a time constant determined by the resistance of resistor 62 and capacitance of capacitor 60. At the start of the negative-going excursion, transistor 58 is cut off because the signal at the base electrode is more negative than that at the emitter. Charging of capacitor 60 commences essentially at the time the signal 52 reaches the −10 volt level, and continues throughout the period of the "square wave" pulse at approximately an exponential rate to produce at the ungrounded electrode of the capacitor a voltage signal substantially as shown by waveform 64, which varies from 0 volts to −10 volts. When the corresponding half-cycle of the −40 volt signal applied to the base of transistor 58 returns to zero volts, by which time capacitor 60 will have been charged to −10 volts, transistor 58 is rendered conducting thereby rapidly discharging capacitor 60 through the emitter-collector junction to ground, and readying the circuit to again charge the capacitor on the next negative-going excursion of the signal 52. The process repeats on each negative-going excursion of the square wave, that is, twice each cycle of the line voltage, to produce a succession of shaped waveforms in fixed phase relationship with the line voltage. Because the remainder of the control circuit requires for its operation a positive-going shaped wave varying from 0 volts to +10 volts, the signal developed at the emitter electrode of transistor 58 is inverted by an inverting amplifier 66 to produce the illustrated waveform 68. The thus-generated shaped waveform signals, which follow approximately an exponential curve from zero to +10 volts, and whose trailing edge is in time coincidence with the zero value of the rectified signal from rectifier 42, are utilized in the control of a plurality of dimmer control channels, one of which is illustrated in FIG. 1 and will now be described.

A low level, unidirectional signal from a remote source (not shown), typically having a value of +10 volts, is applied to terminals 70 and 72, across a potentiometer 74 which, together with a resistor 76, is an adjustable voltage divider, usually contained in the control console, which constitutes the control for adjusting the intensity of the stage lighting. This DC control signal is applied to the base electrode of a transistor 75, one of a Darlington pair, along with the shaped waveform 68, which is coupled from the inverting amplifier 66 through a capacitor 77. The collector electrodes of the Darlington transistors are connected to a source of positive potential, typically +18 volts, represented by the terminal 78, and the emitter electrode is connected through a breakdown diode 80, preferably of the Zener type having a breakdown voltage of 10 volts, and a resistor 82, typically having a value of 12K ohms, to a source of negative potential, typically having a value of −18 volts, represented by the terminal 84. The junction 82a between diode 80 and resistor 82 is connected through a resistor 86, typically having a value of 150 K ohms, and two series-connected diodes 88 and 90, preferably of the silicon type, such as a 1N1305, to a source of negative potential, typically −5 volts, represented by terminal 92. A third diode 94 is connected across the series combination of diodes 88 and 90 and is oppositely poled.

When the DC control voltage from potentiometer 74 is set at 0 volts, the Darlington pair transistors, which form part of a low impedance circuit through the Zener diode 80 and resistor 82, continuously conduct, causing a potential to be developed at junction 82a which is nominally negative with respect to terminal 92, causing diodes 88 and 90 to conduct continuously through resistor 86 to junction 82a, even though the base electrode of transistor 75 is receiving the fixed amplitude shaped waveform 68, because the 10 volt breakdown potential of Zener diode 80 maintains junction 82a negative relative to terminal 92. However, when the DC control signal is set to a level slightly above zero volts, for example, just above the threshold level of the circuit, the sum of the DC potential and the potential of the shaped waveform 68 applied to the base electrode of transistor 75 is passed by Zener diode 80 and causes diodes 88 and 90 to cease conducting for a portion of the period of the shaped waveform 68; specifically, the diodes 88 and 90 do not conduct during that portion of the precision waveform when junction 82a is more positive than terminal 92. The potential at the junction of diodes 88 and 90, which was essentially clamped to the potential of source 92 when the diodes were conducting, now reverse-biases diodes 88 and 90, causing a small current to flow in the input circuit of a limiting amplifier 96 in a direction reversed from that occurring when the diodes where conducting, producing a small positive-going rectangular pulse the leading edge of which is determined by the potential at which diodes 88 and 90 cease conducting and the trailing edge of which is determined by the trailing edge of shaped waveform 68. The diode 94, which is poled oppositely to diodes 88 and 90, functions to limit the amplitude of the thus-generated square wave pulses to a predetermined level. The limiting amplifier 96 is designed to have high gain and to limit its output at approximately +15 volts so as to produce a square wave signal 98 having an amplitude of 15 volts and a pulse width corresponding to the width of the pulses generated by cessation of conduction of diodes 88 and 90. It will be evident that as the level of the DC control signal is raised, the generated rectangular pulses will become wider, and that as the level approaches +10 volts, their width will approach the maximum width of the shaped waveform 68.

The pulses from limiting amplifier 96 are applied through a diode 100 to the gate electrode of a silicon controlled rectifier 102 to control the firing thereof, the diode 100 ensuring application of only positive-going pulses to the gate electrode. A full-wave rectified signal derived from power source 30 is applied to the anode of SCR 102 which, upon firing, supplies the energy for drive pulses ultimately applied to the dimmer unit 10. More specifically the power source voltage is stepped down to a level of 25 volts r.m.s., for example, with a transformer 104, the secondary winding of which is connected across the AC input terminals of a full-wave bridge rectifier 106. The negative terminal of the bridge rectifier is connected to ground, and the unidirectional output voltage at its positive terminal, which cyclically varies from zero to +35 volts, is applied to the anode of SCR 102. Thus, the positive-going excursions of the square wave pulses 98 control the firing of SCR 102 with respect to the full-wave rectified voltage source applied to the anode of SCR 102, which conducts for the duration of the applied gating pulse. The trailing edge of the pulses 98 are always in time coincidence with the negative-going portion of shaped waveform 68 which, in turn, is in time coincidence with the zero intercept of the rectified signal from bridge 42, and the time of occurrence of the leading edge of pulses 98 is controlled with respect thereto as a function of the value of the DC control signal. Thus, as the rectangular pulses 98 get wider, SCR 102 is turned on for a greater portion of each half-cycle of the rectified voltage source applied to the anode of SCR 102.

The cathode of SCR 102 is connected to one terminal of the primary winding 112 of a pulse transformer 114, and the resulting current flow therethrough, and through a resistor 116 in series therewith, induces drive pulses in the secondary winding 118 of the transformer which are timed with the firing of SCR 102 and are of a short duration. These drive pulses are coupled through a coaxial pulse signal cable 120 to the primary winding 20 of the pulse transformer 18 contained in the dimmer unit 10 and control the firing of the reverse-connected SCR's 12 and 14. The current in the primary winding 112 of transformer 114 also flows through an indicator lamp 122, usually mounted on the control console, the intensity of which is controlled by the duration of the conduction of SCR 102, and provides to the console operator an indication of the relative brightness of the stage lighting lamp 16 which, it will be seen, is energized by line voltage of the same phase as that applied to SCR's 12 and 14.

The described connections of the control circuit ensures that when the positive-going drive pulses included in the secondary winding of transformer 114 are applied to the dimmer unit 10, which is energized from the same source as that utilized in the generation of the drive pulses, SCR's 12 and 14 will be gated into conductivity at the same time in successively occurring positive half-cycles that SCR 102 is fired. It will be understood that the primary winding 20 in the dimmer unit 10 is so polarized as to produce positive-going firing pulses at the B end of windings 22 and 24 upon occurrence of a positive-going sine wave potential at the anodes of SCR's 12 and 14. The transfer characteristic of the apparatus between the control signal and the effective voltage applied to the lamp 16 follows approximately an exponential curve, a relationship between control setting and light output which has been found satisfactory for television studio lighting applications.

Although the operation of a single dimmer control channel has been described, an important feature of the invention is that the shaped waveform 68 appearing at the output of the inverting amplifier can be used as a control parameter in a plurality of dimmer control channels, as indicated by the additional capacitors 77', 77'' and 77'''. These capacitors would each be connected to the base electrode of a transistor corresponding to transistor 75, to which would also be applied a DC control signal for that channel. It will be understood that each control channel would include a capacitor corresponding to 77 and the circuitry to the right thereof, through transistor 75, SCR 102 and pulse transformer 114; however, transformer 104 and bridge rectifier 106 would be common to the plurality of channels, with the rectified output voltage applied to the anodes of all of the SCR's corresponding to SCR 102. An essential precaution to be observed is that the shaped waveform 68 derived from a given phase of the three-phase power supply usually used to energize studio lighting systems be used only with dimmer control channels connected to lamps energized from the same phase. Thus, a three-phase system would require only three shaped waveform generating circuits, and three transformer-rectifier circuits 104, 106, to drive a multiplicity of dimmer control channels; that is, the system utilizes only six sixty-cycle transformers (three each of transformers 40 and 104). Only that portion of the circuit to the right of amplifier 66, which involves a relatively small number of inexpensive and small components (the largest of which is the pulse transformer), needs to be duplicated for each channel, and the circuitry for several channels can be mounted on a single circuit card. An important operational advantage is that the performance of all channels controlled by the same shaped waveform 68 is precisely matched.

Figure 2:
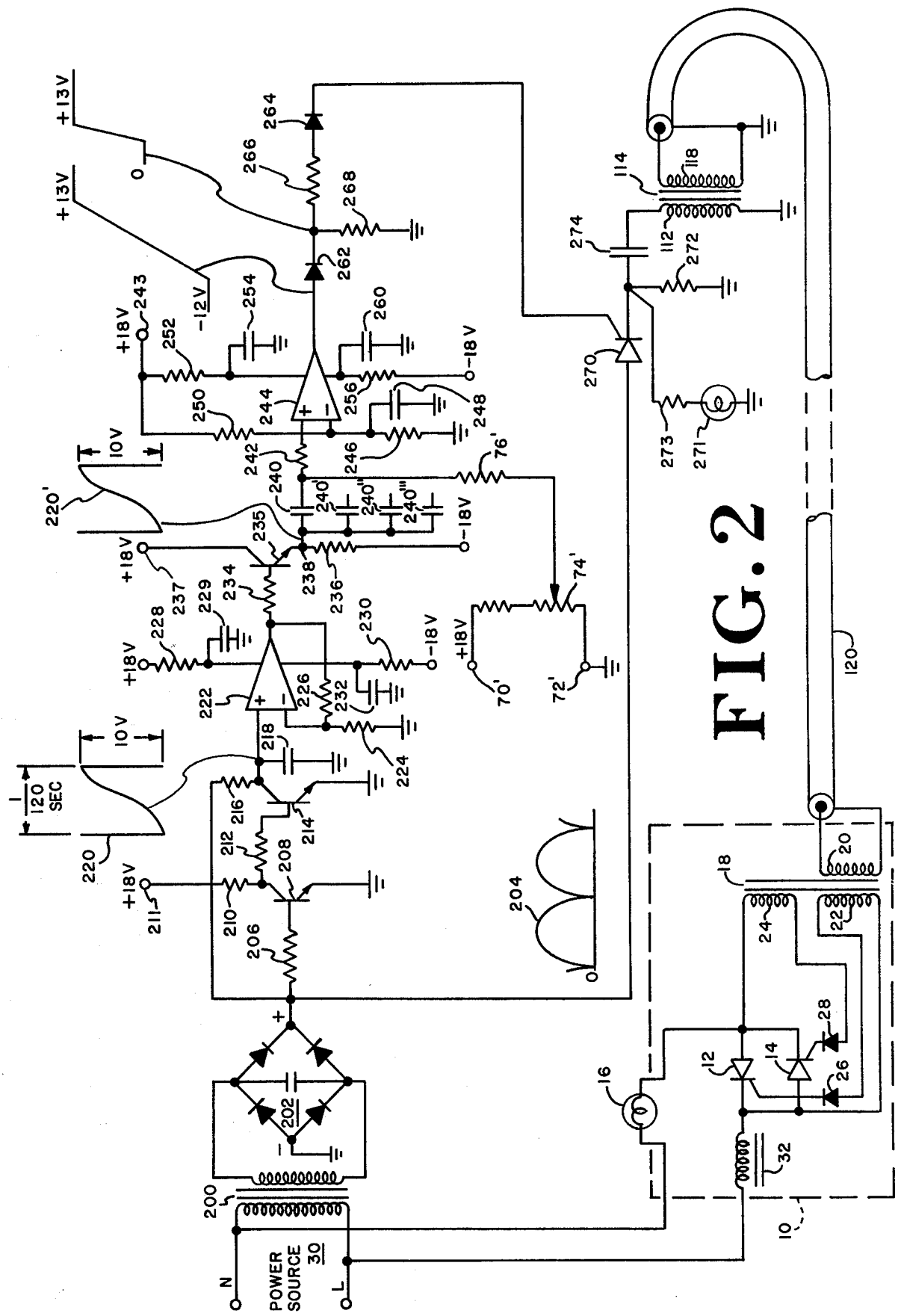
FIG. 2 is a schematic diagram of another embodiment of the dimmer control circuit.

FIG. 2 illustrates an alternative implementation of a control circuit embodying the invention for providing drive pulses to the dimmer unit 10. This system, like the FIG. 1 system, utilizes a shaped waveform of predetermined amplitude and wave shape in fixed phase relationship with the line voltage that energizes the lamp being controlled, and is generated as follows. The voltage from the AC source 30, one phase of the usual 120 volt, 60 Hz., three-phase source, is stepped down to approximately 35 volts peak by a transformer 200 and applied to the AC input terminals of a full-wave bridge rectifier 202, the negative terminal of which is connected to ground. The unidirectional output voltage as the positive terminal, the wave form of which is shown at 204 and cyclically varies from zero volts to approximately +35 volts peak, is applied through a resistor 206 to the base electrode of transistor 208, for example a 2N3904, and also through a resistor 216 to the collector electrode of a transistor 214. The emitter electrode of both of transistors 208 and 214 is grounded. The collector electrode of transistor 208 is connected through a resistor 212 to the base electrode of transistor 214, and through resistor 210 to a source of positive potential, typically having a value of +18 volts, represented by the terminal 211. Typically, resistors 210 and 212 each have a value of 10k ohms, resistor 206 has a value of 30K ohms, and resistor 216 has a value of 470K ohms. The collector electrode of transistor 214 is connected to one terminal of a capacitor 218 the other terminal of which is connected to ground potential, the capacitor typically having a value of 0.47 microfarads, and also to the positive input of an operational amplifier 222.

In operation, the unidirectional output from bridge rectifier 202 maintains transistor 208 in saturation, except during the most negative excursion of the output signal 204 from the rectifier; when transistor 208 is in saturation, its collector is at or near ground potential and transistor 214 is turned off. During the time that transistor 208 is in saturation and transistor 214 is turned off, the output signal from the bridge rectifier is integrated by resistor 216 and capacitor 218 to produce at the positive input of operational amplifier 222 a waveform having the shape illustrated at 222, which is essentially half of a cosine waveform, having a period of 1/120 second and peak-to-peak amplitude of 1.0 volt. The described cycle of operation repeats itself every half-cycle of the 60 Hz input from power source 30.

The output terminal of operational amplifier 222 is connected through a resistor 226, typically having a value of 91K ohms, to the negative input of the amplifier, the negative input also being connected to ground through a resistor 224, typically having a value of 10K ohms. A resistor 228 and a capacitor 229 form a decoupling network for the positive power supply and a resistor 230 and a capacitor 232 form a decoupling network for the negative supply of the amplifier. The values of resistors 224 and 226 establish a gain of ten for the operational amplifier; consequently, a signal having the waveform 220 and a peak-to-peak amplitude of approximately 10 volts is produced at the output terminal of operational amplifier 222. This signal is applied through a buffer resistor 234, typically having a value of 1K ohms, to the base electrode of a transistor 235 connected as an emitter follower for isolation and for power drive capability. In particular, the collector electrode of transistor 235 is connected to a source of positive potential, represented by terminal 237, and the emitter electrode is connected through a resistor 236, typically having a value of 5.1K ohms, to a source of negative potential, typically having a value of 18 volts. Thus, a signal having the waveform 220' and a peak amplitude of 10 volts is developed at the emitter electrode of transistor 235.

The shaped waveform 220' may be utilized as a control parameter in a plurality of dimmer control channels, one of which is illustrated in FIG. 2 and will now be described. The signal at junction 238 is coupled through a capacitor 240 and a resistor 242 to the positive input of a second operational amplifier 244. A low level, unidirectional signal from a remote source, (not shown) having a value of +18 volts in this embodiment is applied to terminals 70' and 72' across a potentiometer 74', the movable contact of which is connected through a resistor 76' to the junction of capacitor 240 and resistor 242. The potentiometer 74', usually contained in the control console, constitutes the control for adjusting the intensity of the lamp associated with the dimmer control channel. The negative input of operational amplifier 244 is connected through a resistor 250, typically having a value of 12K ohms, to the positive potential source 243, and also to ground through a resistor 246, typically having a value of 5.1K ohms. A decoupling capacitor 248 is connected across resistor 246 to prevent the introduction of noise or other extraneous signals onto the negative input. A resistor 252 and a capacitor 254 connected as shown form a decoupling network for the positive power supply and a resistor 256 and a capacitor 260 form a decoupling network for the negative supply for the operational amplifier 244.

In operation, capacitor 240 isolates the DC potential at junction 238 from the DC potential at the junction of capacitor 240 and resistor 242, and couples the shaped waveform 222' to the positive input of operational amplifier 244; the waveform 220' appearing at the junction of capacitor 240 and resistor 242 has its DC level at its 50% amplitude point. The voltage divider action of resistors 246 and 250 biases the negative input of operational amplifier to approximately +5.3 volts, and since the value of the control signal 220' at the positive input cannot exceed approximately +5 volts relative to its 50% axis, the output from the operational amplifier 244, when the movable contact of potentiometer 74' is at ground potential, is approximately −12 volts; however, this negative voltage is blocked from transmission beyond a diode 262 by the back resistance of the diode. When the contact of potentiometer 74' is moved up slightly from ground potential to approximately 0.3 volt, the potential at the positive input terminal exceeds the bias at the negative input terminal for a portion of the period of the waveform 220', and a positive signal of approximately +13 volts amplitude is produced at the output terminal of amplifier 244. When this occurs, diode 262, the cathode of which is connected through a resistor 268 to ground, conducts and produces a positive voltage signal at the junction of diode 262, resistor 268 and a resistor 266. Diode 262 may be a 1N4448, and resistors 266 and 268 typically have values of 27K ohms and 10K ohms, respectively.

Thus, the time at which the transition at the output of operational amplifier 244 occurs, that is, when the voltage on the positive input is more positive than the bias on the negative input of the operational amplifier, is determined by the combination of two signals, the DC control voltage derived from the movable contact of potentiometer 74' and the shaped waveform 220'. The DC control signal, in effect, makes more positive the axis on which the control signal 220' is riding, so that when the DC control potential is increased the transition at the output of the operational amplifier occurs earlier and earlier in time relative to the sine wave output of the source 30, so that the conduction angle (which is ultimately determined by the time of occurrence of the transition) becomes larger and larger. As was noted earlier, the transition in voltage level at the output of amplifier 244 is transferred through diode 262 and develops a potential of approximately 13 volts across resistor 268. This signal is applied through buffer resistor 266 and a diode 264, such as a 10D4, to the gate electrode of an SCR 270, the cathode of which is connected through a resistor 272 to ground and also through a capacitor 274 and the primary winding 112 of a pulse transformer 114 to ground. The full-wave rectified signal from bridge rectifier 202 is applied to the anode of SCR 270. The positive transitions at the output of amplifier 244 control the firing of SCR 270 with respect to the full-wave rectified signal 204 applied to the anode of the SCR. The SCR 270 is turned off in time coincidence with the negative-going excursion of the shaped waveform 220' which, in turn, is in time coincidence with the zero value of the rectified signal 204. When SCR 270 fires, current flows through the primary winding 112, capacitor 274 and the SCR, and induces a positive pulse in the secondary winding 118 of the transformer. Resistor 272 limits the current flow through the SCR during the remainder of the conduction cycle of the SCR, which is automatically turned off when the full-wave rectified signal 204 goes to its zero value. The resulting drive pulses are coupled by a coaxial pulse signal cable 120 to the primary winding 20 of the pulse transformer 18 contained in the dimmer unit 10 and control the firing of the reverse-connected SCR's 12 and 14 in the manner described in connection with FIG. 1. When SCR 270 fires, current also flows through an indicator lamp 271, usually mounted on the control console, the intensity of which is controlled by the duration of the conduction of SCR 270, and provides to the console operator an indication of the relative brightness of the stage lighting lamp 16 which, it will be noted, is energized from the same phase of AC source 30 as that applied to SCR's 12 and 14.

Figure 3:
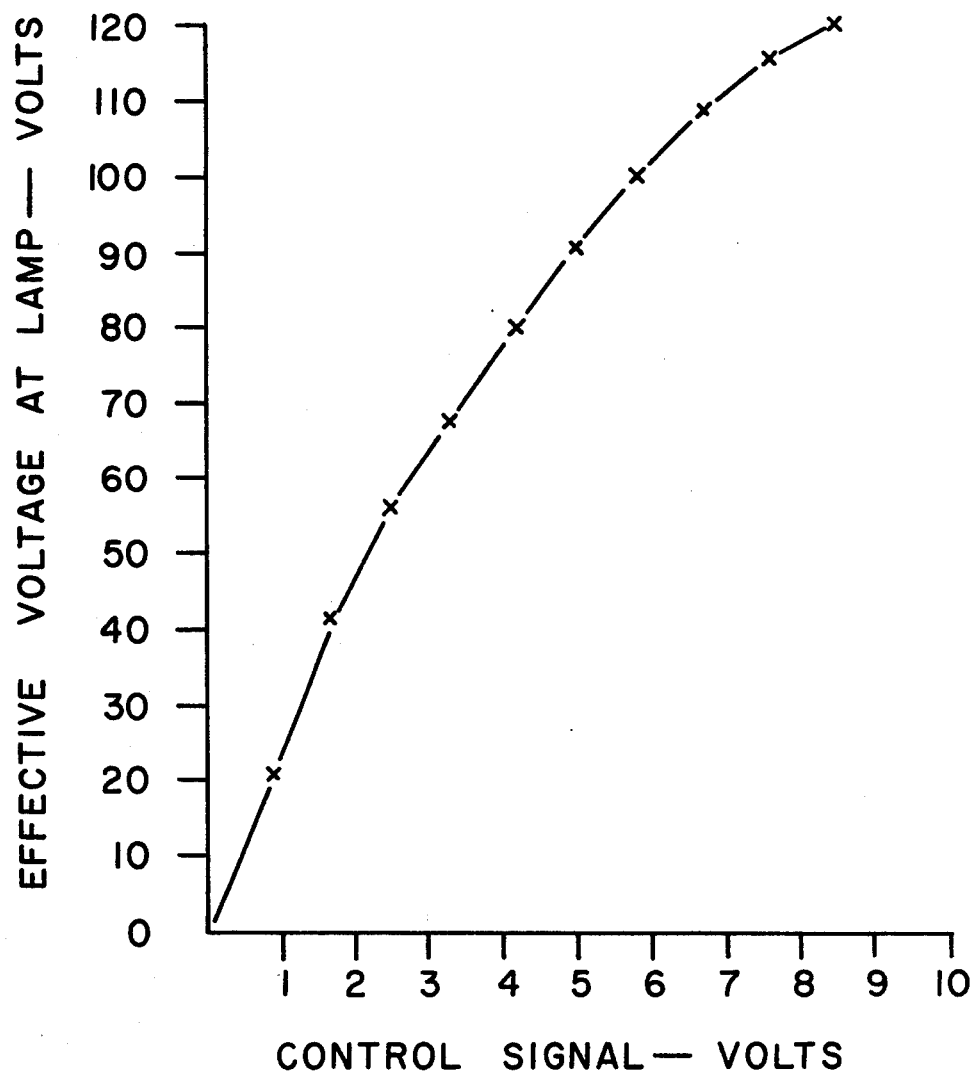
FIG. 3 is a graph illustrating the transfer characteristics of the dimmer control circuit of FIG. 2.

Although there is some diversity of opinion as to what is the preferred relationship between the DC control signal and the light output of the controlled lamp, it is generally accepted by the industry that the transfer characteristic should follow substantially a square law curve. In the present circuit, the utilization of the chopped cosine control signal 220' in combination with a DC control signal, produces an effective voltage at the lamp being controlled that varies in approximately a square law relationship with the DC control signal, as shown in FIG. 3. In FIG. 3 the abscissa represents the DC control signal in volts, and the ordinate represents the effective voltage applied to the lamp load from the silicon controlled rectifiers 12 and 14.

As in the system of FIG. 1, the shaped waveform 220' appearing at junction 238 can be used as a control parameter in a plurality of dimmer control channels, as indicated by the additional capacitors 240', 240" and 240'''. These capacitors would be connected to respective amplifiers corresponding to operational amplifier 244, to which would also be applied a DC control signal individual to each channel. It is understood that each such control channel would include its own diodes 262 and 264 and SCR 270, but that the full-wave rectified signal 204 would be applied to the anodes of of all of the SCR's. Also, as in the FIG. 1 circuit, the shaped waveform 220' derived from a given phase of the 3-phase power supply would be used only with dimmer control channels connected to lamps energized from that phase. It will be recognized that the implementation shown in FIG. 2 affords the same cost and operational advantages.

From the foregoing, it is seen that a lamp control system constructed in accordance with the principles of the invention provides control of light intensity, on a dimmer per lamp basis, and employs a relatively simple circuit constructed of inexpensive, commercially available components.

While two specific embodiments of the invention have been described, many modifications may be made without departing from the spirit and scope of the invention. For example, instead of using a gate-controlled rectifier and a pulse transformer to generate drive pulses in timed relationship with the leading edge of the rectangular pulses (i.e., SCR 102 in FIG. 1 and SCR 270 in FIG. 2), a suitably configured transistor pulse circuit operating from a DC potential source, instead of from the described rectified AC source, may be used. When using a transistor pulse circuit, the drive pulses may be coupled to the dimmer unit either capacitively or by transformer action. Also, it is not essential that the shaped waveforms 68 and 220 be derived from the power source 30; they can, instead, be derived from a separate 60 Hz oscillator that is phase-locked to the power line.

I claim:

1. In a lighting system for television studios and the like including an AC voltage source for supplying voltage to one or more lamps and a dimmer unit connected to each of said one or more lamps for controlling the effective voltage applied to a respective lamp and consisting essentially of a pair of gate-controlled rectifiers having anode, cathode and gate electrodes connected with their anode-to-cathode paths in inverse parallel arrangement between one terminal of said AC voltage source and one terminal of the association lamp, and first pulse transformer means for applying drive pulses to the gate electrodes of said rectifiers for rendering said rectifiers alternately conductive in successively occurring half-cycles of said AC voltage source, apparatus for producing drive pulses individual to each of said one or more dimmer units, said apparatus comprising, in combination:

first circuit means for deriving waveform signals of predetermined shape and amplitude and of a duration corresponding to the period of a half-cycle of the voltage from said AC source and having a fixed phase-relationship thereto;

a dimmer control channel for each of said one or more lamps, each including second circuit means connected to receive an adjustable DC control voltage and said shaped waveform signals and operative to produce rectangular pulses the time of occurrence of the leading edge of which is determined by the combined potential of said DC control voltage and said shaped waveform, and the trailing edges of which are in time coincidence with the zero crossing of said AC voltage source;

third circuit means connected to receive said rectangular pulses and operative in response thereto to generate drive pulses in time coincidence with the leading edge of each of said rectangular pulses; and means for coupling said drive pulses to the first pulse transformer means of a respective one of said dimmer units.

2. Apparatus according to claim 1, wherein said first circuit means comprises:

first rectifier means for full-wave rectifying the voltage from said AC source, and pulse-shaping circuit means connected to receive the full-wave rectified voltage from said first rectifying means and operative to generate waveform signals having a positive-going portion corresponding essentially to half of a cosine curve and having a negative-going trailing edge substantially in time coincidence with the zero value of the full-wave rectified voltage.

3. Apparatus according to claim 2, wherein said second circuit means comprises:
   operational amplifier means having positive and negative inputs and an output terminal,
   means for applying said shaped waveform signals and said DC control voltage to the positive input of said operational amplifier,
   means for biasing the negative input of said operational amplifier at substantially the potential of the DC voltage axis of said shaped waveform signals, and
   means connected to the output terminal of said operational amplifier for generating a positive-going rectangular pulse whenever the combined potential of said DC control voltage and of said shaped waveform signals exceeds the bias of said negative input.

4. Apparatus according to claim 3, wherein said last-mentioned means comprises
   a diode and a resistor connected in that order between the output terminal of said operational amplifier and a source of reference potential, said diode being poled to conduct only when the potential at the output terminal of said amplifier is positive with respect to said reference potential.

5. Apparatus according to claim 4, wherein said third circuit means comprises:
   a third gate-controlled rectifier having anode, cathode and gate electrodes connected to receive said rectangular pulses at its gate electrode,
   second pulse transformer means having a primary winding connected to the cathode of said third gate-controlled rectifier, and a secondary winding, and
   means for applying the full-wave rectified voltage from said first rectifier means to the anode electrode of all of the third gate-controlled rectifiers in said one or more dimmer control channels,
   each of said third gate-controlled rectifiers upon being fired by rectangular pulses applied to their respective gate electrodes causing a drive pulse to be produced in the secondary winding of its associated second pulse transformer means.

6. Apparatus according to claim 1, wherein said first circuit means comprises:
   first rectifier means for full-wave rectifying the voltage from said AC source, and
   pulse-shaping circuit means connected to receive the full-wave rectified voltage from said first rectifier means and operative to generate waveform signals having a positive-going approximately exponential wave shape and a negative-going trailing edge substantially in time coincidence with the zero value of the full-wave rectified voltage.

7. Apparatus according to claim 6, wherein said second circuit means comprises:
   a transistor having base, collector and emitter electrodes connected in emitter follower configuration,
   means for applying said shaped waveform signals and said DC control voltage to the base electrode of said transistor, and
   means connected in the emitter circuit of said transistor operative to initiate generation of a positive-going rectangular pulse in response to the combined potential of said DC control voltage and said shaped waveform signals exceeding a predetermined bias potential.

8. Apparatus according to claim 7, wherein said third circuit means comprises:
   a third gate-controlled rectifier having anode, cathode and gate electrodes connected to receive said rectangular pulse at its gate electrode,
   second pulse transformer means having a primary winding connected to the cathode electrode of said third gate-controlled electrode, and a secondary winding,
   second rectifier means for full-wave rectifying the voltage from said AC source, and
   means for applying the full-wave rectified voltage from said second rectifier means to the anode electrode of all of the third gate-controlled rectifiers in said one or more dimmer control channels,
   each of said third gate-controlled rectifiers upon being fired by rectangular pulses applied to their gate electrodes causing a drive pulse to be produced in the secondary winding of its associated second pulse transformer means.

9. Apparatus according to claim 1, wherein said AC voltage source is a three-phase source,
   wherein each phase of said source has respective first circuit means associated therewith for deriving waveform signals of predetermined shape and amplitude and having a fixed phase-relationship to the voltage from the respective phase, and
   wherein the three separate shaped waveform signals are applied to one or more dimmer control channels connected to control one or more lamps energized from the same phase of the AC voltage source as that from which the applied shaped waveform signal is derived.

* * * * *